April 23, 1935.  A. BRÖER  1,999,081
CREAM RIPENING VAT
Filed Jan. 23, 1934   2 Sheets-Sheet 1
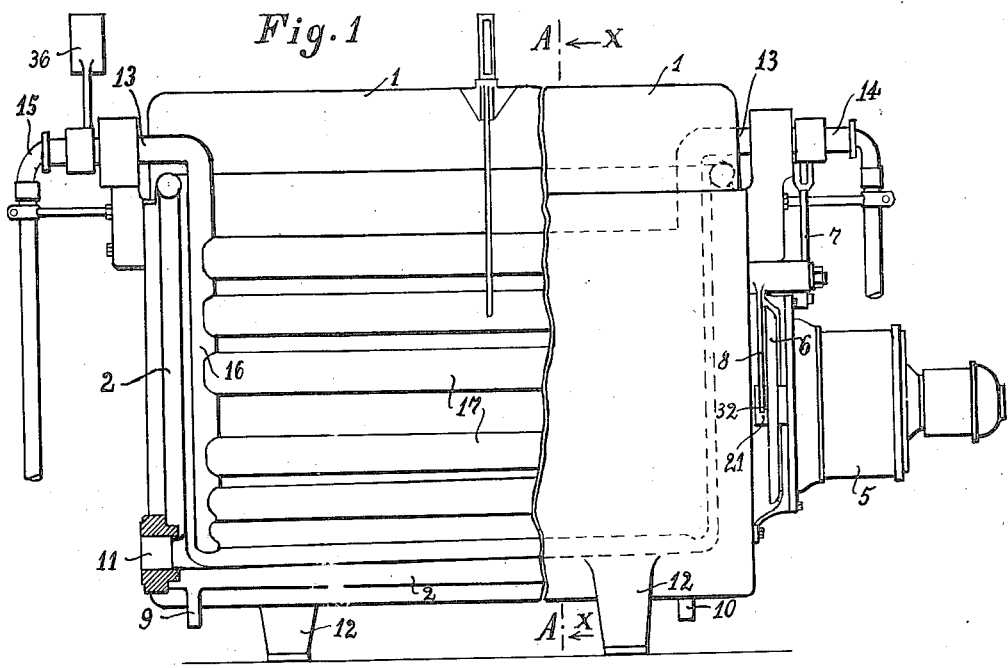
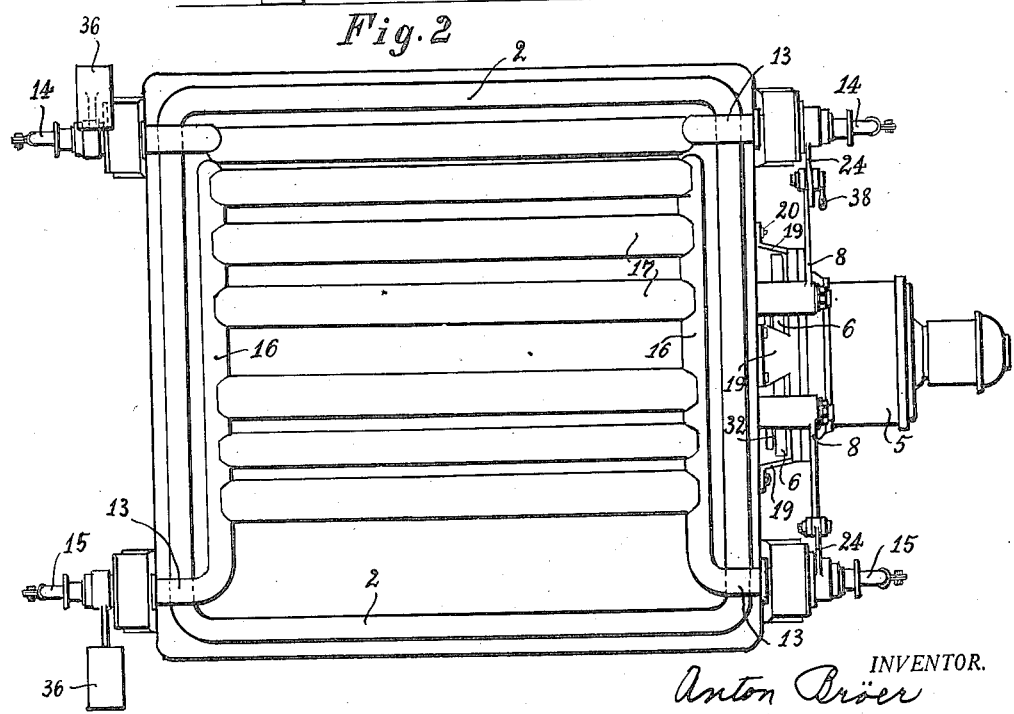
INVENTOR.
Anton Bröer
BY
ATTORNEY.

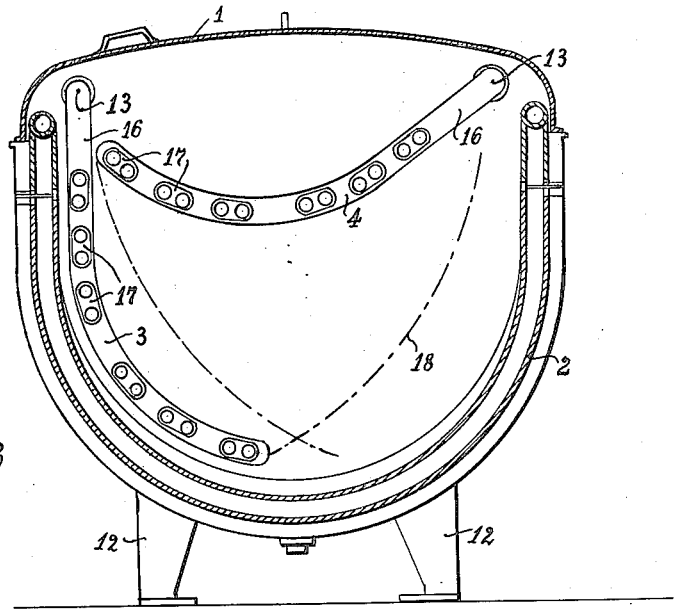
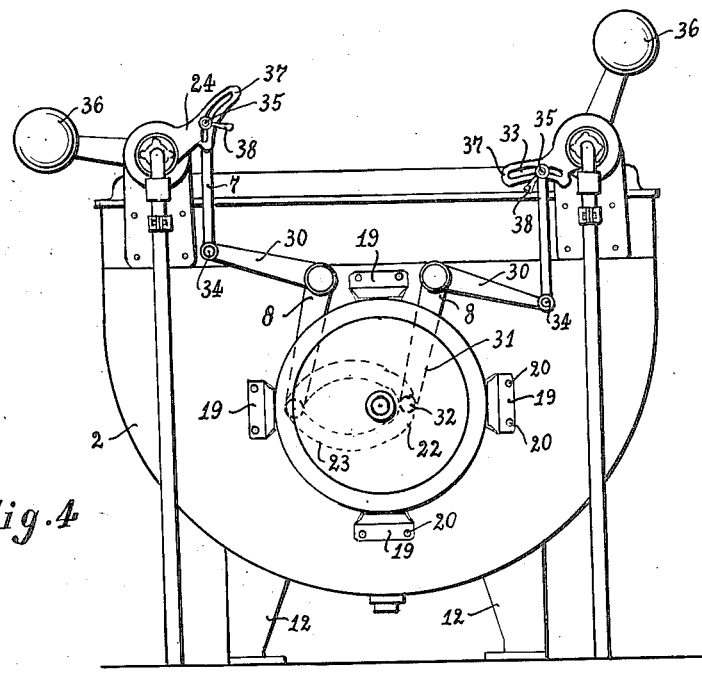

Patented Apr. 23, 1935

1,999,081

UNITED STATES PATENT OFFICE 1,999,081

CREAM RIPENING VAT

Anton Bröer, Hamburg, Germany, assignor to the firm Schwelmer Eisenwerk Müller & Co. Aktiengesellschaft, Schwelm, Westphalia, Germany Application January 23, 1934, Serial No. 707,991
In Germany January 25, 1933

7 Claims. (Cl. 257—78)

The present invention relates to a vat provided with a stirrer, within which a heat-exchanging medium is made to circulate, for the treatment of cream. In the known vats of this kind the stirrer is situated in the longitudinal central plane of the vat and the heating or cooling medium is made to flow through the stirrer from one end-wall of the vat to the other. This arrangement has proved to embody certain disadvantages, not only with regard to a thorough mixing, but also to a uniform heating or cooling of the cream which, no doubt, may be traced back to a great extent to the fact, that the attainable size and with it, the effective surface of the stirrer, simultaneously serving as heat-exchanging device, corresponds only to about one half the diameter of the vat and that the stirring movement takes place essentially parallel to the inner face of the wall of the vat. Moreover, owing to the passage of the cooling or heating medium taking place in one direction only, an undesirably big drop in temperature will be entailed from one end-wall of the vat to the other. Furthermore, it should be borne in mind that in the previously known cream ripening vats the path of motion of the stirrer will always be the same quite irrespective of the varying charge of the vat, so that, with a moderate charge, an extensive contact of the cream with the air within the vat above the smooth surface of the cream, will be unavoidable, which may easily lead to an infection of the cream and impair its keeping qualities and, considered from an hygienic point of view, also of the quality of the cream or the butter.

As a result of the present invention a cream ripening vat has been created, in which all the disadvantageous features referred to above, have been avoided.

In accordance with the present invention the new cream ripener has been provided with two reciprocally moved stirring blades, fitted to the longitudinal walls of the vat, which very nearly extend right up to the longitudinal central line of the bottom of the vat and which, when in their lowest position, are adapted to the shape of the cream ripening vat. In consequence of this disposition the path of the stirring surface is no longer parallel, but essentially vertical to the walls of the vat and each blade of the stirrer will be made to pass within the unit of time and at the identical stirring speed, through about double the quantity of cream as in the previously known devices. The axles of the stirrer may be advantageously situated somewhat above the axis of curvature of the cylindrically curved inner fact of the vat. In this arrangement the width of the stirrer may be almost identical with the diameter of the vat and each of the two stirrers will simultaneously establish contact with nearly the whole of the cross sectional area of the vat.

For the purpose of obviating drops of temperature between the end walls of the vat the connecting branches of the stirrer for the admission or those for the discharge of the tempering liquid for the one stirrer may be advantageously positioned on one end wall and that for the other stirrer on the opposite end wall, with the result that the tempering medium is made to pass through the two stirrers in two directions opposite to each other and thus neutralize the drops in temperature of the two flows in their joint effect upon the charge of the vat in relation to each other.

The shafts of the stirrers may suitably be coupled through the medium of rod systems with a curve disk disposed on the driving shaft, said curve disk possessing on identical portions of its circumference alternately a concentric and a non-concentric curve part, which are made to alternately act in conjunction with one of the two rod systems.

The transmission gear between the curve disk and the rocking shafts of the stirrers may advantageously be arranged adjustably through the medium of link-slides interpolated in the rod systems. This will render it possible, in a most simple manner, to attain an adjustable stroke so as to properly adapt same to the volume of the charge which may be contained in the vat at any time, whereby particularly an undesirably extensive contact of the cream with the air, if the charge contained in the vat is only a small one, will be avoided. This, furthermore, furnishes the possibility of completely and automatically lifting the stirrers from the vat for the purpose of cleaning them, merely by adjusting upon a larger stroke, which most essentially facilitates the operation of the cream ripening vats, particularly those of large dimensions and wholly excludes any possibility of damage, which may otherwise easily be the case, by awkwardly lifting out or replacing the disconnected stirrers by hand.

In the accompanying drawings the object of the present invention has been represented by way of example, in which Fig. 1 represents a longitudinal section through a cream ripening vat along the centre line, Fig. 2 a top view of the vat with the cover removed, Fig. 3 a cross sectional view of the vat along the line A—A of Fig. 1, seen in the direction of the arrows x, whilst Fig. 4 represents a front view of the vat seen from the side of drive of same.

The cream ripener, which has been represented by way of example is made to essentially consist of a trough-like hollow-walled container 2 adapted to be closed up by means of a cover 1. Within said container 2 two rockingly disposed stirrer-blades 3, 4, consisting of grid- or strainer-like tubular network, are provided, being actuated by means of a motor 5, attached to one of the two end-walls of the container, through the medium of a curve disk 6 and a rod system 7, 8.

The container 2 consists of a vat, the upper part of which is of rectangular shape, whilst the lower part thereof is so curved that it is of semicircular cross section, while the hollow space, formed by the double wall, is provided with connecting branches 9, 10 for the cooling and heating medium. The container is, moreover, fitted with a discharge branch 11 being positioned at the lowest point of the bottom of the container slightly sloping down towards the left end wall. The cream ripener is supported by feet 12 attached to the container 2. The stirrer blades 3, 4 are rockingly supported by shafts 13 running parallel to the upper longitudinal edges of the container 2 and in the immediate proximity thereof. The shafts are hollow, simultaneously serving as inlet and outlet, being connected with their free ends, projecting from the container to the piping for the cooling or heating medium. In connection herewith the connecting branches 14, 15 for the admission or for the discharge of the tempering liquid are disposed for the one stirring device 3 on one end wall of the container and for the other stirring device on the other end wall thereof, so that the two stirrer blades, connected with their lateral jaws 16 to the hollow shafts 13 are adapted to receive the tempering liquid, flowing through said stirrer blades in two directions opposite to each other, thus neutralizing the drops in temperature of the two flows in their total effect upon the charge contained in the vat. The two jaws 16 are made to serve not only for the mechanical, but also for the guiding connection of the tubes 17 running in a longitudinal direction from one end wall to the other serving simultaneously for stirring and heating or cooling the cream. The blades, being composed of the tubes 17 and the lateral jaws 16 thus represent a rake- or comb-like tubular network. The blades, being in their lowermost position, extend almost to the longitudinal centre of the bottom of the container and are so curved that they conform to the curvature of the inner wall of the container. As soon as the blades are rocked about the shafts 13, the free ends of said blades will be made to pass along two arcs 18 intersecting each other and indicated by chain-dotted lines. The two blades are not actuated simultaneously in the container, but alternately, in such a manner, that one of the two blades remains in its lowermost position, when the other blade is made to pass through the container or through the contents thereof. During its rocking motion the one blade passes so closely the other blade in its position of rest that the cream is made to establish an exceedingly close contact not only with the blade being passed through the container or through the contents thereof, but also with the blade which is in its position of rest, inasmuch as the cream is in perpetual motion not only in relation to the rocked blade, but also to the blade being in its position of rest. This will render it possible to attain an extremely thorough agitation and a very extensive and effective cooling or heating surface. The effectiveness of the blades with regard to a proper mixing, as well as a uniform heating or cooling of the cream, will be further enhanced by the fact, that the tubes 17 are made to possess an oblong, slightly elliptic shape of cross section, in connection with which the longitudinal axis of the cross section is disposed transversely to the direct of rocking of the stirrers. The motor, provided for the purpose of actuating the stirrer blades 3, 4 is shown in the drawing to be attached to the right front wall with the aid of four butt straps 19 and bolts 20. The motor shaft 21 is made to carry on its end turned towards the container, the curve disk 6, working in conjunction with the rod systems 7, 8. On each of its half circumferences the curve disk 6 is provided with a concentric curve part 22 and a nonconcentric curve part 23, which alternately establish contact with one of the two rod systems. The rod systems 7, 8 essentially consist of vertical rods 7 engaging arms 24, on shafts 13, and cranked levers 8, the pivot of which is situated in the angle of the lever, and rockingly positioned on a journal provided in the front wall of the container in the vicinity of the longitudinal central plane of the vat. The rods have been linked with their lower ends to these free ends of the arms 30 projected outwardly in an almost horizontal position, whilst the free ends of the other arms 31, pointing in a downward direction, are made to engage the curve disk 6 by means of the journal or pin 32. In consequence of the rocking motion of the crank lever 8 caused by the rotation of the curve disk, the rods 7 will, as is obvious, be moved up and down and thus bring about an oscillation of the shafts 13 and the desired rocking motion of the stirrer blades carried by the shafts 13.

The bosses of the joint 37 of the arms 24 of the shafts 13 are designed as links, the slot 33 of which is made to pass along an arc described in the down-position round the lower fulcrum 34 of the vertical rods 7. By means of altering the adjustment of the upper fulcrum 35 of the rod 7 along the link slot 33 with the aid of the screw 38, it will be possible to bring about a multiplication or reduction of the ratio of gear between the curve disk 6 and the shaft 13. It will thus be possible, without altering the down-position of the stirrer-blades, to effect an extensive change of the stroke of the stirrer blades. Finally, at the ends of the shafts 13, turned away from the driving side, counterweights 36, attached to radial arms, have been provided.

It is a matter of course, that the present invention is not limited to the example of performance represented herein, but that also many modifications and other forms of performance are possible.

I claim:

1. A vat serving for the treatment of cream with a hollow stirrer through which a heat exchanging medium is made to pass and characterized by having side walls provided with longitudinal edges, shafts supported adjacent said edges for oscillatory movement, means to impart oscillatory motion to said shafts, and rake-like stirrer blades carried by said shafts and positioned to intersect each other in their paths of action and movable alternately up and down.

2. Vat in accordance with claim 1, characterized thereby, that the stirrer blades almost extend to the longitudinal centre line and are curved in such a manner that in their down position they conform to the shape of the inner wall of the container.

3. Cream ripening vat in accordance with claim 1, characterized thereby, that the connecting branch of the stirrers for the admission or for the discharge of the tempering liquid for the one stirrer is positioned on the one end wall and for the other stirrer on the other end wall.

4. Cream ripening vat in accordance with claim 1, characterized thereby, that the rocking shafts of the stirrers are arranged somewhat above the curvature axis of the cylindrically curved inner face of the vat and the width of said blades is substantially the width of said vat.

5. Cream ripening vat in accordance with claim 1, characterized thereby, that the shafts of the stirrers are coupled by means of rod systems, with a curve disk disposed on the driving shaft, said curve disk being provided on equal parts of its circumference alternately with a concentric and a non-concentric curve part, which alternately establish contact with one of the two rod systems.

6. A cream ripening vat in accordance with claim 1 characterized by having the shafts of the stirrers coupled by means of rod systems and by having a driving shaft provided with a curve or cam disk alternately actuating the rod systems, said rod systems having link slides interpolated therein for adjustment of the oscillation of the first mentioned shafts.

7. A cream ripening vat in accordance with claim 1, characterized by the feature that the cross section of the pipes of the stirrer blades is enlarged transversely of the direction in which the rocking is done and that the said cross section is of oblong formation.

ANTON BRÖER.